Patented May 22, 1951

2,554,319

UNITED STATES PATENT OFFICE 2,554,319

PROCESS FOR PRODUCING CUPROUS OXIDE

Joseph W. Ayers, Easton, Pa., assignor, by mesne assignments, to C. K. Williams & Co., East St. Louis, Ill., a corporation of Delaware No Drawing. Application April 23, 1946, Serial No. 664,442

13 Claims. (Cl. 23—148)

This invention relates to the production of cuprous oxide by the reaction of cupric oxide and a solid reducing agent, and more particularly to a continuous process of producing cuprous oxide in which cupric oxide and carbon in substantially stoichiometric proportions are passed through a heating zone in which reduction occurs with liberation of carbon dioxide, and cuprous oxide is obtained in substantially quantitative yields.

Cupric oxide has heretofore been produced on a commercial scale either by an electrolytic precipitation process or by a pyrometallurgical process employing a gaseous reducing agent. Neither of these processes is completely satisfactory, for among other disadvantages the former requires a large amount of expensive electrical energy and the latter involves a long cycle batch operation and high labor costs. Other processes have been suggested but have not been introduced commercially for any of a number of reasons, usually their high cost.

The primary object of the invention is to provide an improved process of producing cuprous oxide which is economical to operate and easy to control in such manner as to produce a substantially pure cuprous oxide meeting all industrial specifications.

Since cuprous oxide deteriorates in the presence of air due to oxidation, another object of the invention is to provide a process for stabilizing freshly produced oxides such that their efficiency will not be reduced upon their subsequent use.

Broadly considered, the invention may be considered to comprise processes for the production of cuprous oxide involving heating an intimately blended mixture of cupric oxide and pulverulent carbon in a nonoxidizing (inert or reducing) atmosphere at a temperature at which the carbon reacts with the cupric oxide and forms cuprous oxide and carbon dioxide, the period of heating required to complete the reaction being comparatively short and ordinarily amounting to only a few minutes. The heating or reduction step is preferably carried out in a continuous process such as by passing the mixture to be treated through an externally heated rotary kiln.

The process of the present invention is applicable to the treatment of cupric oxide materials in general and may be applied to pure or substantially pure cupric oxide or such oxides containing zinc oxide or other impurities. It is particularly adapted for the treatment of by-product or commercial mixed oxides composed of cupric oxide and cuprous oxide which ordinarily contain some water combined therein. One such product is known as "still chipping." The preferred solid reducing agent is finely divided carbon such as carbon black and lamp black ordinarily produced for pigment and like purposes. The materials containing cupric oxide are referred to hereinafter as "cupric oxide materials."

If the carbon reducing agent is present during the reduction action in the form of lumps or aggregates of small particles, it leads to over-reduction of the cupric oxide which is adjacent to said particles and to the formation of metallic copper. However, if the carbon is for the most part in finely divided condition dispersed throughout the mass but partly in lump or aggregated form, the cuprous oxide product obtained may possess the metallic copper in particles large enough to be screened out, thereby leaving the cuprous oxide in a condition which meets most purity requirements for commercial use.

The production of the initial mixture of cupric oxide and carbon may be accomplished by thoroughly blending together finely divided cupric oxide and pulverulent carbon until all carbon aggregates of appreciable size are broken up and uniformly distributed throughout the mass. The production of the homogeneous mixture may be accomplished in any conventional manner and may be suitably effected by first mixing the ingredients together and then grinding the resulting mass in a suitable mill. The mixture is preferably ground to a product substantially all of which is capable of passing through a 325 mesh screen.

In producing the mixture of materials to be treated, the amount of carbon employed should be determined by and based upon the cupric oxide content of the raw material used. Substantially stoichiometric proportions of carbon lead to best results, for lesser amounts do not effect complete reduction of the cupric oxide and greater amounts lead to over-reduction and the production of metallic copper to the extent of the excess carbon.

In the reduction operation the mixture to be reacted is heated preferably to a temperature around 1400° F. Temperatures as low as 1100° F. can be employed but ordinarily such temperatures lead to incomplete reduction. Temperatures higher than about 1400° F. can be employed but the additional expense is not justified. Temperatures of from 1300° to 1500° F. usually give good results.

The invention may be effectively carried out in the following manner:

A raw material composed of mixed copper oxides and containing from 12% to 16% free surface moisture is fed into a processing unit which simultaneously grinds, dries and classifies the material. Average samples of the material are next analyzed to compute the amount of reducing agent needed to convert all of the cupric oxide to the cuprous oxide state. A measured amount of the classified cupric oxide breed of surface moisture, together with the proper calculated amount of reducing agent are fed into a blender wherein the ingredients are mixed until substantial uniformity is obtained. Thereafter the blended mixture is conveyed to and passed into a hammermill wherein any lumps and aggregates are disintegrated and blended into the mixture. The obtained mass is next fed into a continuous rotary, indirectly fired, substantially air tight kiln in which the mass is heated to approximately 1400° F. and kept at this temperature until the desired reduction is accomplished. In the kiln, steam is formed through liberation of the combined water and carbon dioxide is liberated by the reaction of the carbon with the cupric oxide. These gases are substantially inert and hence do not have any adverse effect upon the reduction reaction. If desired, the inert gases produced in the kiln may be supplemented by additional nonoxidizing gases such as steam piped into the kiln.

When the formation of the cuprous oxide is complete and the mass has reached the discharge end of the kiln, the hot product leaves the kiln and is conveyed in a system sealed from air to a cooler in which the cuprous oxide is stabilized to prevent oxidation upon contact with air.

The stabilization of the cuprous oxide product is, in accordance with the present invention, accomplished by coating the particles with a suitable oil. This result is preferably accomplished by spraying liquid pine oil through an atomizing nozzle on the oxide particles while they are sufficiently hot to effect vaporization of the oil and then cooling the oxide thereby causing the oil to condense and deposit on the surfaces of the particles thereby coating the same. One-half of one percent of pine oil uniformly deposited on the surfaces of the particles has been ascertained to be sufficient to stabilize the oxide product against oxidation for a period of 72 hours in an atmosphere containing 98% humidity at a temperature of 100° F.

The stabilization may be accomplished by the use of oils similar to pine oil and other oils as well. Examples of other oils are: rosin oil, castor oil, rape oil and sesame oil.

Pine oil is preferred since it not only stabilizes the oxide but it also acts as a dispersing agent for pigments when the oxide is incorporated in organic vehicles.

If desired the cooled and coated product may then be passed through a disintegrator for fine pulverizing before being packed in sealed metal drums.

Example 1

Raw material composed of 87.75% cupric oxide and 5.94% cuprous oxide together with 3.3% of carbon black were blended and ground together to form a homogeneous mixture. This mixture was then passed through a continuous rotary kiln in an inert atmosphere and heated to a temperature around 1400° F. until reduction to the cuprous oxide state is complete. The product obtained upon cooling the mass in the absence of air contained 98.63% cuprous oxide, .41% cupric oxide, .22% metallic copper, 88.13% total copper and 99.1% total reducing power as cuprous oxide.

Example 2

A raw material composed of 82.47% cupric oxide, 12.47% cuprous oxide together with 3% of carbon black were blended and ground together until a homogeneous mass was obtained and then passed through a rotary kiln in an inert atmosphere and heated therein to a temperature of 1400° F. until reduction to the cuprous oxide state was complete. After being cooled in an inert atmosphere, the product was screened to remove a few granules of metallic copper contained in the mass resulting from the use of a slight excess of carbon. On analysis, the product was found to contain 99.25% cuprous oxide, no cupric oxide, .15% metallic copper, 88.03% total copper and 99.6% total reducing power as cuprous oxide.

Example 3

A mixture of a copper material containing 59.84% cupric oxide, 28.55% cuprous oxide, 5.61% of zinc oxide and 6% of water, together with 2.5% of carbon black was blended and ground together until a homogeneous mass was obtained. This mass was then passed through a rotary kiln in an inert atmosphere and heated to a temperature of around 1400° F. until reduction to the cuprous oxide state was complete. After cooling, the product was analyzed and found to contain 94.83% cuprous oxide, .06% cupric oxide, .24% metallic copper, 84.25% total copper and 95.37% total reducing power as cuprous oxide.

The instant process in its preferred mode of operation has a number of advantages over the prior art processes. It is a continuous process requiring the minimum of supervision and labor. It is economical to operate and easy to control. It leads to substantially quantitative conversion of the cupric oxide to cuprous oxide. The product produced is substantially free of copper metal as well as of cupric oxide. Finally the process is one in which the cuprous oxide may be easily stabilized against air oxidation.

The cuprous oxide products of the present invention may be used in the same fields as the present cuprous oxide products on the market and may be employed successfully as a fungicide, as a catalyst, as a toxic ingredient in antifouling paint and as an intermediate product in the manufacture of metallic copper powder.

It should be understood that the present invention is not limited to the specific details given herein but that it extends to all equivalents which will occur to those skilled in the art upon consideration of the scope of the claims appended hereto.

I claim:

1. In the reduction of cupric oxide directly to cuprous oxide, the improvement which comprises intimately mixing the cupric oxide with a stoichiometric proportion of carbon in pulverulent form calculated to produce the cuprous oxide and continuously passing the resulting mixture through a heating zone in a non-oxidizing atmosphere wherein the mixture is heated to at least 1100° F. and the cupric oxide is reduced substantially only to cuprous oxide by the action of said carbon.

2. The process of producing cuprous oxide which comprises grinding together a mixture consisting of cupric oxide material and carbon in substantially stoichiometric proportions in relation to the cupric oxide content thereof thereof thereby forming an intimate mixture of the same and heating and reacting the same together in an atmosphere of steam at a temperature of at least 1100° F. until the reaction between said reactants is substantially complete.

3. The process of producing cuprous oxide which comprises grinding together a mixture consisting of a cupric oxide material and carbon in an amount calculated to reduce the cupric oxide present only to the cuprous oxide stage and heating the resulting mixture in a non-oxidizing atmosphere to a temperature of from 1300 to 1500° F. until the reaction therebetween is substantially complete.

4. The process of producing cuprous oxide which comprises intimately blending together a cupric oxide material and finely divided carbon, grinding the resulting mixture and passing the same through a heating zone in a non-oxidizing atmosphere wherein the mixture is heated to a temperature of at least 1100° F. and the oxide is reduced directly and substantially only to cuprous oxide, and cooling the mass in an inert atmosphere.

5. The process of producing cuprous oxide which comprises continuously passing through a heating zone a mixture consisting of a cupric oxide material containing carbon distributed therethrough in lump free pulverulent form and heating the resulting mixture in said zone in a non-oxidizing atmosphere to a temperature of at least 1100° F. whereby substantially the whole cupric oxide content is reduced substantially only to the cuprous form.

6. The process of producing cuprous oxide which comprises heating together in a non-oxidizing atmosphere an intimately blended mixture of cupric oxide and carbon, composed substantially of particles capable of passing through a 325 mesh screen, to a temperature of at least 1100° F. until the reaction between said reactants is substantially complete and cuprous oxide and carbon dioxide has formed.

7. The process of producing cuprous oxide which comprises intimately blending together a mixture of cupric oxide material and carbon in a pulverulent form substantially all of which is capable of passing through a 325 mesh screen and heating the resulting mixture in a non-oxidizing atmosphere to a temperature of at least 1100° F. until the reaction between said reactants is substantially complete, the amount of carbon used being substantially that required to reduce the cupric oxide only as far as the cuprous oxide state.

8. The process of producing cuprous oxide which comprises intimately blending together a cupric oxide material and carbon in substantially stoichiometric proportions calculated to produce the cuprous oxide, the mixture being in the form of finely divided particles substantially all of which is capable of passing through a 325 mesh screen and continuously passing the resulting mixture through a heating zone in an atmosphere of steam, wherein the mixture is heated to a temperature of at least 1100° F. and the oxide is reduced substantially only to the cuprous form by reaction with the carbon.

9. The process of producing cuprous oxide which comprises heating an intimately blended mixture of a cupric oxide containing combined water and carbon in pulverulent form by continuously passing the resulting mixture through a heating zone in an atmosphere of steam liberated from said cupric oxide material, in which zone the mixture is heated to at least 1100° F. and the oxide is reduced substantially only to the cuprous form.

10. The process of producing cuprous oxide which comprises intimately blending a cupric oxide material with pulverulent carbon and reducing the cupric oxide to cuprous oxide solely by the action of such carbon as the sole reducing agent by heating the said mixture to a temperature of from 1300 to 1500° F. in a non-oxidizing atmosphere until the oxide is reduced substantially only to the cuprous form.

11. The process of producing cuprous oxide in a form substantially free of metallic copper which comprises thoroughly blending a cupric oxide material with pulverulent carbon in substantially stoichiometric proportions to form cuprous oxide until any lumps of carbon are broken up and dispersed in the mixture, and heating the resulting mixture in a non-oxidizing atmosphere to a temperature of at least 1100° F. while the mixture is continuously passing through a heating zone, whereby uniform and complete reduction of the cupric oxide content occurs and substantially only cuprous oxide is produced.

12. In the reduction of cupric oxide to cuprous oxide the improvement which comprises heating an intimately blended mixture of cupric oxide and carbon in a non-oxidizing atmosphere to a temperature of at least 1100° F. until the reduction of the cupric oxide to cuprous oxide by the action of the carbon is substantially complete, and before the cuprous oxide product is exposed to the air coating the particles of the same with an oil.

13. In the reduction of cupric oxide to cuprous oxide the improvement which comprises heating an intimately blended mixture of cupric oxide and carbon in a non-oxidizing atmosphere to a temperature of at least 1100° F. until the reduction of the cupric oxide to cuprous oxide by the action of the carbon is substantially complete, and before the cuprous oxide product is exposed to the air and while the same is hot, spraying the particles with pine oil whereby the oil is vaporized, and then cooling the mass whereby the oil condenses upon and coats the surface of the particles.

JOSEPH W. AYERS.

REFERENCES CITED

The following references are of record in the file of this patent:

UNITED STATES PATENTS

| Number | Name | Date |
|---|---|---|
| 714,914 | Keith | Dec. 2, 1902 |
| 1,160,980 | Geer | Nov. 16, 1915 |
| 2,026,086 | Farncomb | Dec. 31, 1935 |
| 2,184,617 | Hurd | Dec. 26, 1939 |
| 2,385,066 | Du Rose et al. | Sept. 18, 1945 |
| 2,385,078 | Harshaw et al. | Sept. 18, 1945 |

OTHER REFERENCES

Ephraim: "Inorganic Chemistry," 4th ed., pages 442–445 (1943), Nordeman Publ. Co., Inc., New York.

Mellor: "Treatise on Inorganic and Theoretical Chemistry," vol. 3, page 118 (1923), Longmans Green and Co., New York.